United States Patent [19]

D'Angelo et al.

[11] Patent Number: 5,522,257
[45] Date of Patent: Jun. 4, 1996

[54] SUSPENDED SINGLE ROLL DYNAMOMETER

[75] Inventors: Severino D'Angelo, Laguna Beach; James D. Kisner, Trabuco Canyon, both of Calif.

[73] Assignee: AVL North America, Inc., Novi, Mich.

[21] Appl. No.: 454,615

[22] Filed: May 31, 1995

Related U.S. Application Data

[63] Continuation of Ser. No. 243,023, May 16, 1994, abandoned.

[51] Int. Cl.⁶ ........................................... G01L 5/13
[52] U.S. Cl. ........................................... 73/117; 73/123
[58] Field of Search ........................... 73/117, 123, 118.1, 73/117.3

[56] References Cited

U.S. PATENT DOCUMENTS

| | | | |
|---|---|---|---|
| 4,468,955 | 9/1984 | Yamasaki et al. | 73/117 |
| 4,825,690 | 5/1989 | Mears | 73/117 |
| 4,953,391 | 9/1990 | Schober et al. | 73/117 |
| 5,136,878 | 8/1992 | Wolcott | 73/117 |
| 5,154,076 | 10/1992 | Wilson et al. | 73/117 |
| 5,269,179 | 12/1993 | Vattakatu et al. | 73/117 |
| 5,277,060 | 1/1994 | Lehman et al. | 73/117 |
| 5,311,770 | 5/1994 | D'Angelo | |
| 5,385,042 | 1/1995 | La Belle | 73/117 |

Primary Examiner—Richard Chilcot
Assistant Examiner—Max Noori
Attorney, Agent, or Firm—Harness, Dickey & Pierce

[57] ABSTRACT

A suspended large, single roll dynamometer for use in a compact pit. The dynamometer includes a power absorption unit operably coupled to a pair of rolls. The rolls support the driven wheels of a vehicle thereon for rotational movement. A cradle is used to support the power absorption unit, and thus the rolls, within the pit in a manner which does not require significant clearance between the perimeter of the cradle or the rolls and the interior walls of the pit. The components associated with the dynamometer which require periodic access and/or maintenance are further disposed on the power absorption unit so as to be readily physically accessible by an individual without physically entering the pit. The dynamometer apparatus allows the use of a significantly smaller pit than has heretofore been required by conventional dynamometers, thereby providing a significant cost savings in the installation of the pit and allowing the dynamometer apparatus of the present invention to be used in a variety of environments where space limitations would prevent the installation of a conventionally sized pit typically needed for large, single roll dynamometer systems.

27 Claims, 6 Drawing Sheets

SUSPENDED SINGLE ROLL DYNAMOMETER

This is a continuation of U.S. patent application Ser. No. 08/243,023, filed May 16, 1994 now abandoned.

BACKGROUND OF THE INVENTION

1. Technical Field

This invention relates to dynamometers, and more particularly to a suspended single, large roll dynamometer adapted to be disposed within a compact pit with only a limited amount of clearance between the perimeter of the dynamometer and the interior walls of the pit.

2. Discussion

Single, large roll dynamometers are used in a wide variety of applications for simulating road load and inertia forces experienced by vehicles during testing and/or monitoring of various components of the vehicle, such as the engine thereof. Single roll dynamometers are typically disposed within a large pit in a floor of a test facility and include a large roll for engaging each driven wheel of the vehicle. Typically, the diameter of the rolls ranges from about 36" to about 48" or more. Until the present time, the dimensions of the pit had to be sufficient to allow easy access to various components which require periodic access by an individual such as a technician and for allowing individuals to enter the pit to install and service the dynamometer. The components requiring periodic inspection, maintenance or repair have heretofore been mounted on or near the dynamometer in positions not readily accessible from the top of the pit. Such prior art single roll dynamometers have thus required dimensions typically on the order of about 16 feet in length, 10 feet in width and 8 feet in depth. This is considerably larger than the overall dimensions of most 48" roll dynamometers, which typically range in length from about 10–12 feet, in width from about 4.5 feet to 5.0 feet and in overall height from about 4.5 feet to 5.5 feet.

The large pits required for the installation and service of prior art dynamometer have necessitated relatively costly decking to cover the relatively large pit area. Still further, the large dimensions of the pit, which can often be similar to those of a room, represent a costly component of a dynamometer system. Also, since the dimensions of pits associated with prior art dynamometers are large enough to allow individuals to physically enter the pit, suitable, and often costly, precautions must usually be employed to ensure that the dynamometer is not operated while an individual is in the pit.

In view of the above it will be appreciated that the size of a pit which has been heretofore required with prior art dynamometers can represent a significant cost in the overall installation of the system. Still further, the relatively large dimensions of the pit sometimes limit the areas in which a dynamometer system can be installed.

Accordingly, it is a principal object of the present invention to provide a dynamometer apparatus adapted to be disposed in a relatively compact pit without requiring the typically needed clearance around the perimeter of the dynamometer for access by an individual either in the installation of the dynamometer or to effect periodic inspection or repair of its various components.

It is yet another object of the present invention to provide a dynamometer apparatus having means for suspending the apparatus within a compact pit.

It is still another object of the present invention to provide a dynamometer apparatus having its various components which require user access either during installation or for periodic inspection, maintenance or repair disposed in such a manner that same may be readily accessed by an individual without the individual physically entering the pit.

It is still another object of the present invention to provide a dynamometer apparatus having a cradle for suspending the dynamometer within a compact pit, where the cradle may be secured to the pit by one or more individuals without the need for the individuals to physically enter the pit to effect installation.

It is still another object of the present invention to provide a dynamometer apparatus having a cradle for suspending the apparatus within a compact pit, and where the cradle includes means for allowing for thermal expansion and contraction of the cradle relative to the pit walls in response to significant ambient temperature changes within the pit or its surrounding environment.

SUMMARY OF THE INVENTION

The above and other objects are provided by a suspended single roll dynamometer apparatus in accordance with preferred embodiments of the present invention. The apparatus generally includes a pair of rolls for engaging and supporting the driven wheels of a vehicle when the wheels are positioned over the rolls, a power absorption unit disposed between the rolls and having the input shaft physically coupled to each of the rolls for allowing road load and inertia forces to be simulated, and a cradle for supporting the power absorption unit within a pit.

The dynamometer apparatus of the present invention further has its various components which require periodic maintenance and/or repair disposed so as to be readily accessible by an individual without the individual physically entering the pit once the apparatus is installed in a pit. Accordingly, the typically required clearance between the perimeter of the dynamometer and the pit walls to allow for access by individuals to areas of the apparatus not accessible without entering the pit is not needed.

The cradle for supporting the power absorption unit within the pit further includes structure by which the cradle itself may be physically secured to the pit walls without requiring an individual to physically enter the pit to secure the cradle to the pit walls. In a preferred embodiment the cradle also includes means for restrictively clamping portions thereof to the pit walls to allow the cradle to move slightly in various horizontal directions in response to thermal expansion and contraction of the cradle which may be experienced during significant ambient temperature changes within the pit area.

The dynamometer apparatus of the present invention thus allows a single roll dynamometer to be used within a very compact pit area without the typically required clearance around the perimeter of the dynamometer to allow for access by individuals to various portions of the dynamometer not readily accessible from the outside of the pit. In this manner the dynamometer apparatus of the present invention may be used in relatively compact pits which are only slightly larger in overall dimensions than the dynamometer apparatus itself, thus enabling significant cost savings to be realized. The cradle of the apparatus further allows the entire dynamometer apparatus to be disposed within the pit without requiring one or more individuals to physically enter areas of the pit during the installation process.

By allowing a roll dynamometer to be installed within a significantly smaller pit area than has heretofore been required, it is anticipated that the apparatus of the present invention will find use in a variety of applications where sufficient space would not have otherwise been available for a conventionally large sized pit.

BRIEF DESCRIPTION OF THE DRAWINGS

The various advantages of the present invention will become apparent to one skilled in the art by reading the following specification and subjoined claims and by referencing the following drawings in which:

FIG. 2 is a front cross sectional view of the dynamometer apparatus shown in FIG. 1 illustrating more clearly the minimal clearance required between the pit walls and the perimeter of the apparatus;

FIG. 4a is a cross sectional end view of the apparatus through the bearing assembly supporting the input shaft on the cradle, as indicated by section line 4a–4a in FIG. 2;

FIG. 9 is a side cross sectional view of an air directing tubular member in accordance with section line 9—9 in FIG. 2 for directing a cooling air flow into the area between the power absorption unit and the cradle of the dynamometer apparatus.

DETAILED DESCRIPTION OF THE PREFERRED EMBODIMENT

Figure 1:
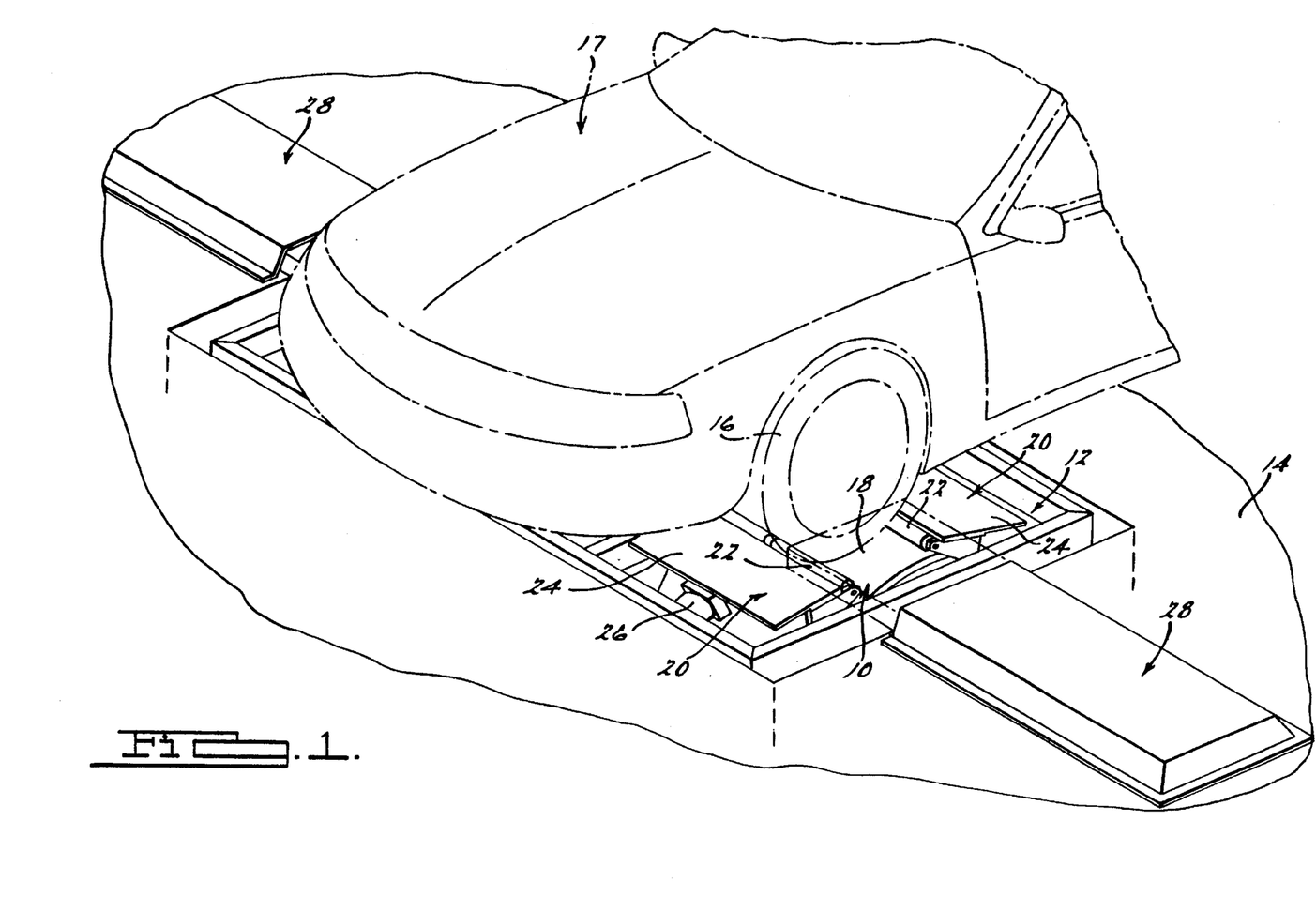
FIG. 1 is a perspective view of a front portion of a vehicle showing the driven wheels thereof being supported by the rolls of the dynamometer apparatus of the present invention, with the dynamometer apparatus being installed in a compact pit formed in a floor.

Referring to FIG. 1, there is shown a single roll dynamometer apparatus 10 in accordance with a preferred embodiment of the present invention. The dynamometer apparatus 10 is disposed within a compact pit 12 formed within a floor 14. The dynamometer apparatus 10 is adapted to engage the driven wheels 16 of a vehicle 17 to enable various road load and inertia forces typically experienced by the vehicle during use to be simulated.

With further reference to FIG. 1, the dynamometer 10 apparatus includes a pair of preferably 48 inch diameter rolls 18 (only one of which is visible in FIG. 1) for supporting the driven wheels 16. A pair of tire centering roller assemblies 20 is positioned on opposite sides of each roll 18 for helping to maintain each driven wheel 16 centered over its respective roll 18. Each tire centering roller assembly 20 includes a roller 22 adapted to rollably engage one of the driven wheels 16, a cover 24 adapted to cover and bridge the area between the exposed surface of the rolls 18 and the walls of the pit 12, and pneumatic cylinders 26 associated with each roller 22 for urging its associated rollers 22 into engagement with its associated driven wheel 16.

The dynamometer apparatus 10 further preferably includes a pair of roll cover assemblies 28 which are movable slidably inwardly towards the driven wheels 16 to cover the exposed portions of the rolls 18 during operation of the dynamometer 10. The specific structure comprising these assemblies 28 will be discussed momentarily.

Referring now to FIG. 2, the dynamometer apparatus 10 further includes a power absorption unit 30 secured within a tubular metal frame 29 and disposed in between the rolls 18. The power absorption unit 30 includes an input shaft 32 extending in alignment with the axis of rotation of each roll 18 and is physically coupled to each roll 18 to thereby be driven by the rolls 18 when the rolls 18 are driven by the driven wheels 16 of the vehicle 17. A pair of bearing assemblies 34 (shown in phantom) are incorporated for rotationally supporting the input shaft 32. A static brake 35 is included for applying a controlled braking force to one of the rolls 18.

Figure 3:
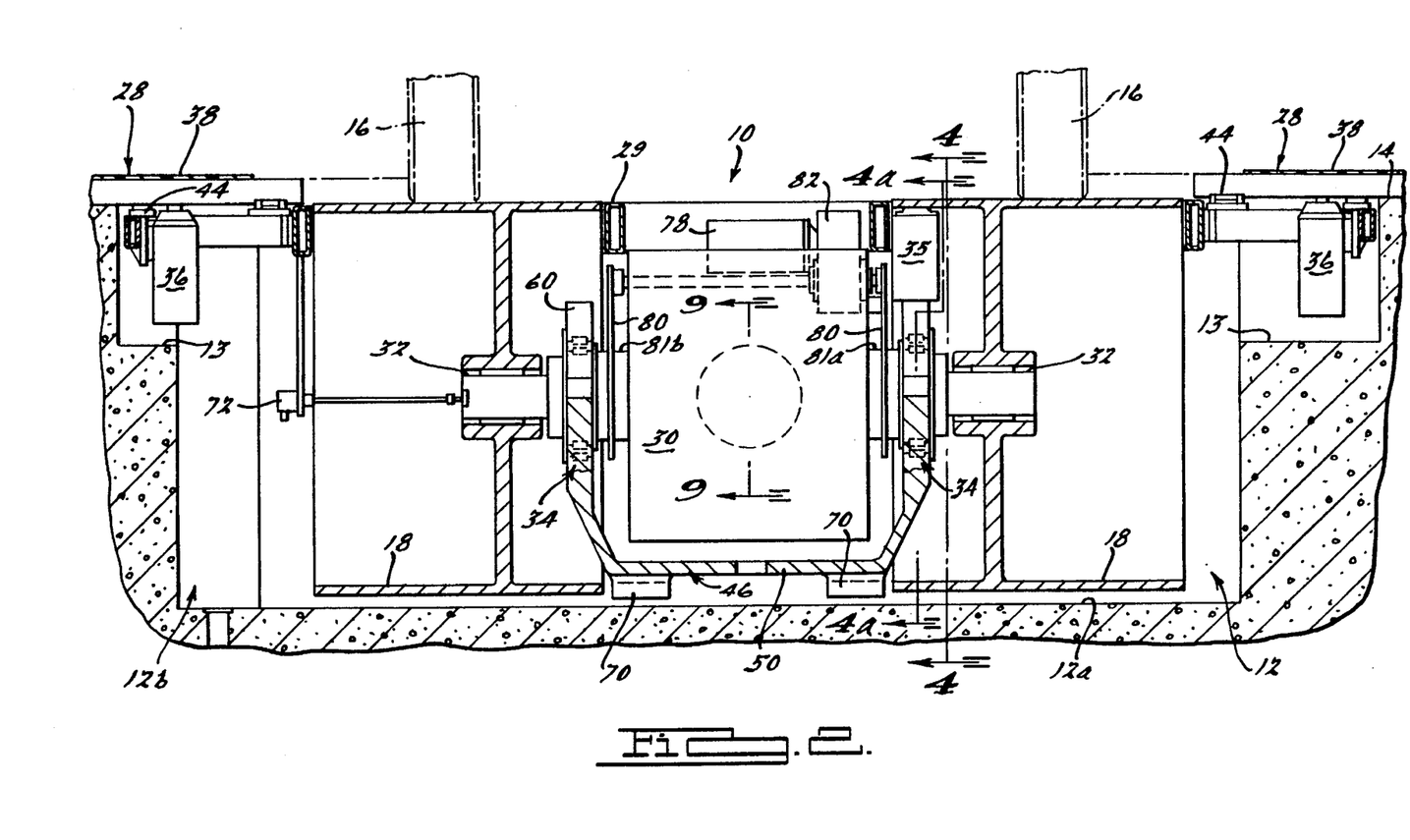
FIG. 3 is a top view of the dynamometer apparatus of FIG. 1.

Referring now to FIGS. 2 and 3, each of the roll cover assemblies 28 includes a reversible dc motor 36 operably coupled to a cover 38 via a conventional pinion gear 40 and race 42. The cover 38 is disposed on a conventional linear bearing 44 to enable the cover 38 to be supported for smooth sliding movement. Accordingly, by driving the motors 36 in opposite directions the covers 38 can be driven slidably towards and away from their respective driven wheels 16 to cover the exposed portions of the rolls 18 during operation of the apparatus 10. A shallow cavity 13 is formed at opposite ends of the pit 12 to allow the dc motors 36 to be disposed below the level of the floor 14.

Figure 4:
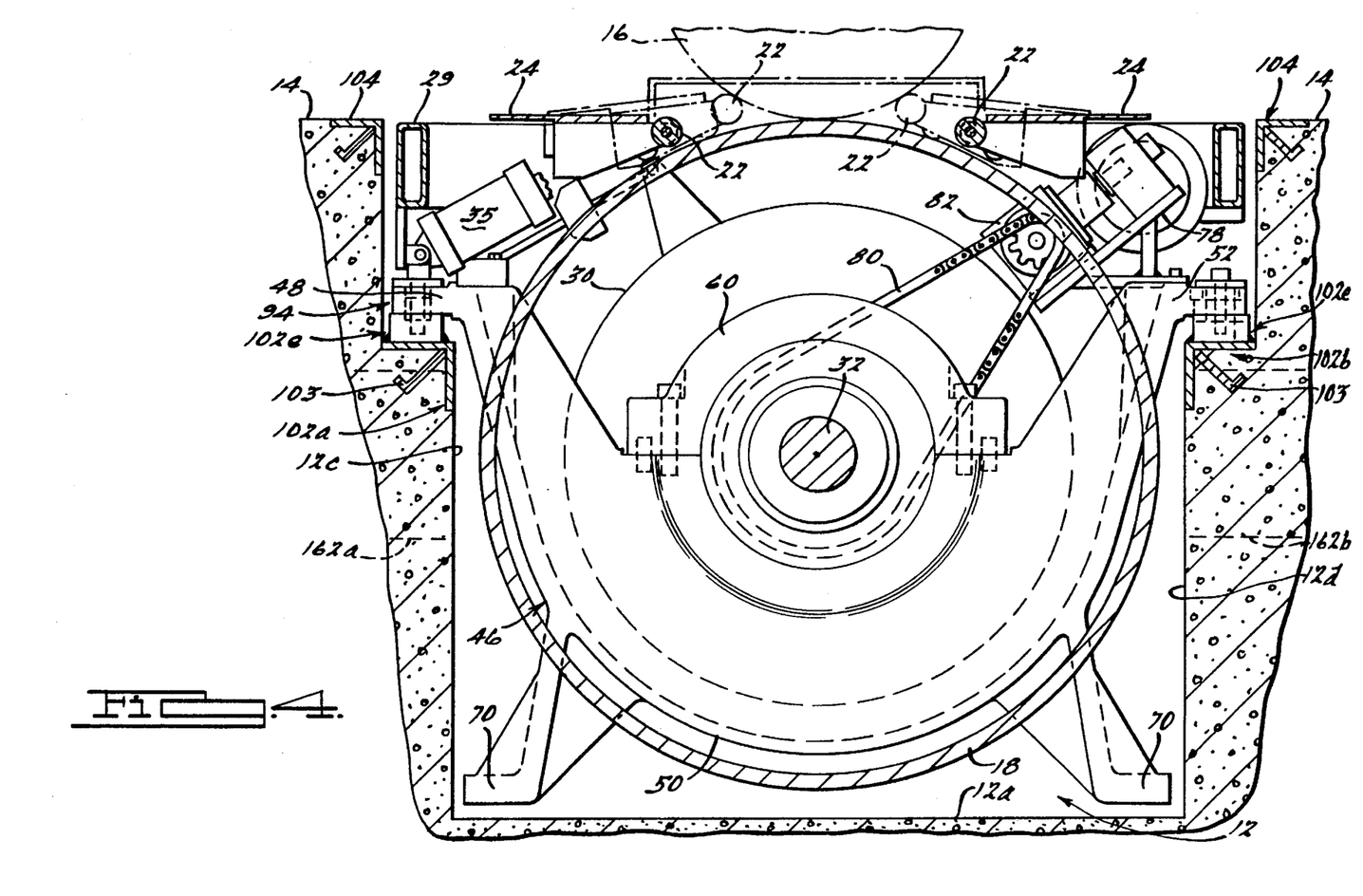
FIG. 4 is a cross sectional end view in accordance with section line 4—4 in FIG. 2 of the dynamometer apparatus of FIG. 2.

With further reference to FIGS. 2 and 4, the dynamometer apparatus 10 advantageously includes a cradle 46 for supporting the power absorption unit 30, and thus the rolls 18, within the pit 12. The preferred embodiment of the cradle 46 further enables the power absorption unit 30 to be suspended within the pit 12. It will be appreciated immediately, however, that the cradle 46 could easily be adapted to enable it to be positioned directly on a floor 12a of the pit 12 in lieu of being suspended, if so desired. The important criterion is that the cradle 46 be capable of supporting the power absorption unit 30 and the rolls 18 securely relative to the pit 12.

Figures 4, 5, 6, 7, 8:
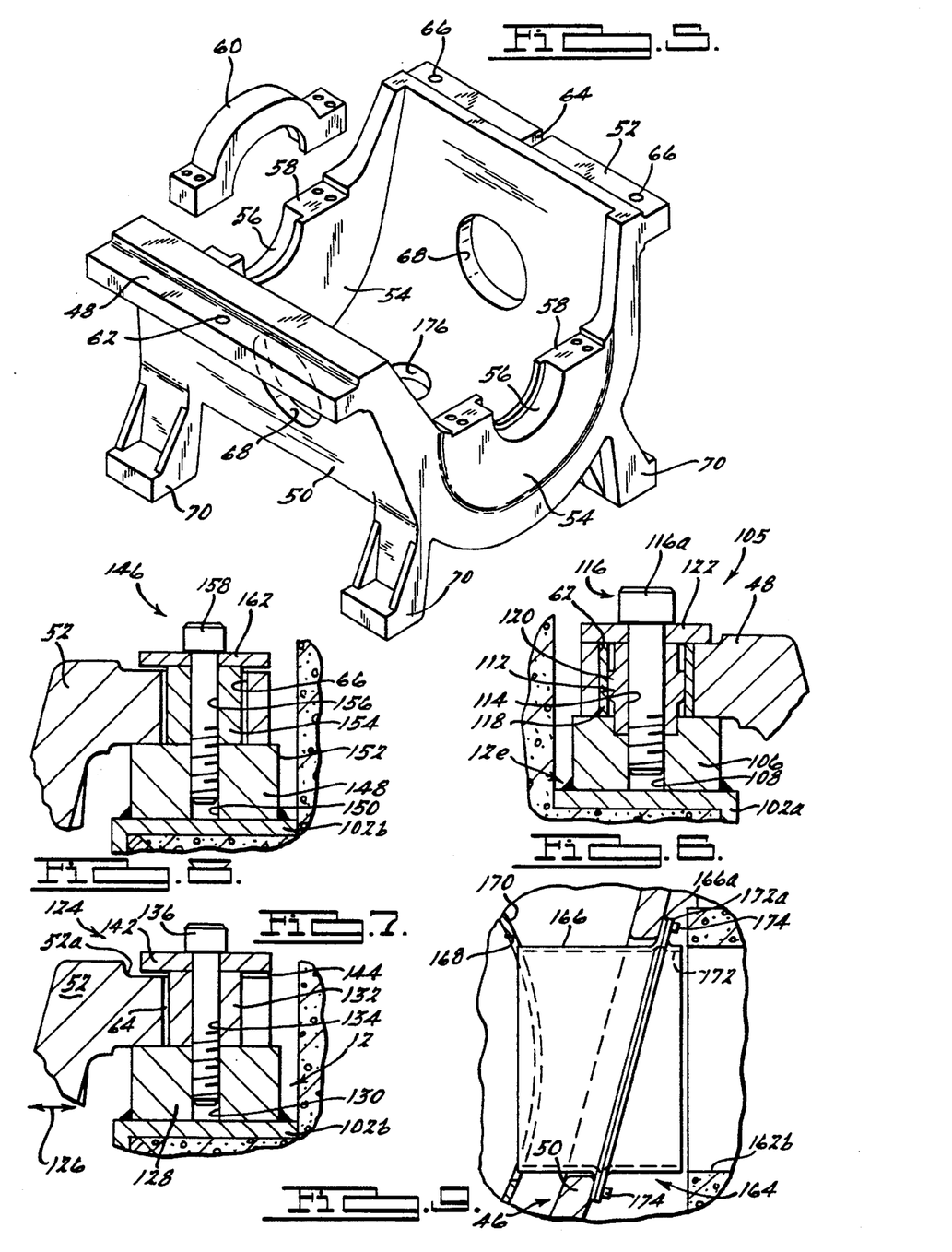
FIG. 5 is a perspective view of the cradle used for supporting the power absorption unit of the dynamometer apparatus within the pit.
FIG. 6 is a cross sectional side view of a pivotal restrictive clamping assembly in accordance with section line 6—6 in FIG. 3.
FIG. 7 is a side cross sectional view of a linear restrictive clamping assembly in accordance with section line 7—7 in FIG. 3 for allowing movement of a portion of the cradle in opposite, linear horizontal directions.
FIG. 8 is a side cross sectional view of a third restrictive clamping assembly in accordance with section line 8—8 in FIG. 3 for allowing a limited degree of movement of the cradle in any horizontal direction.
Figure 5:
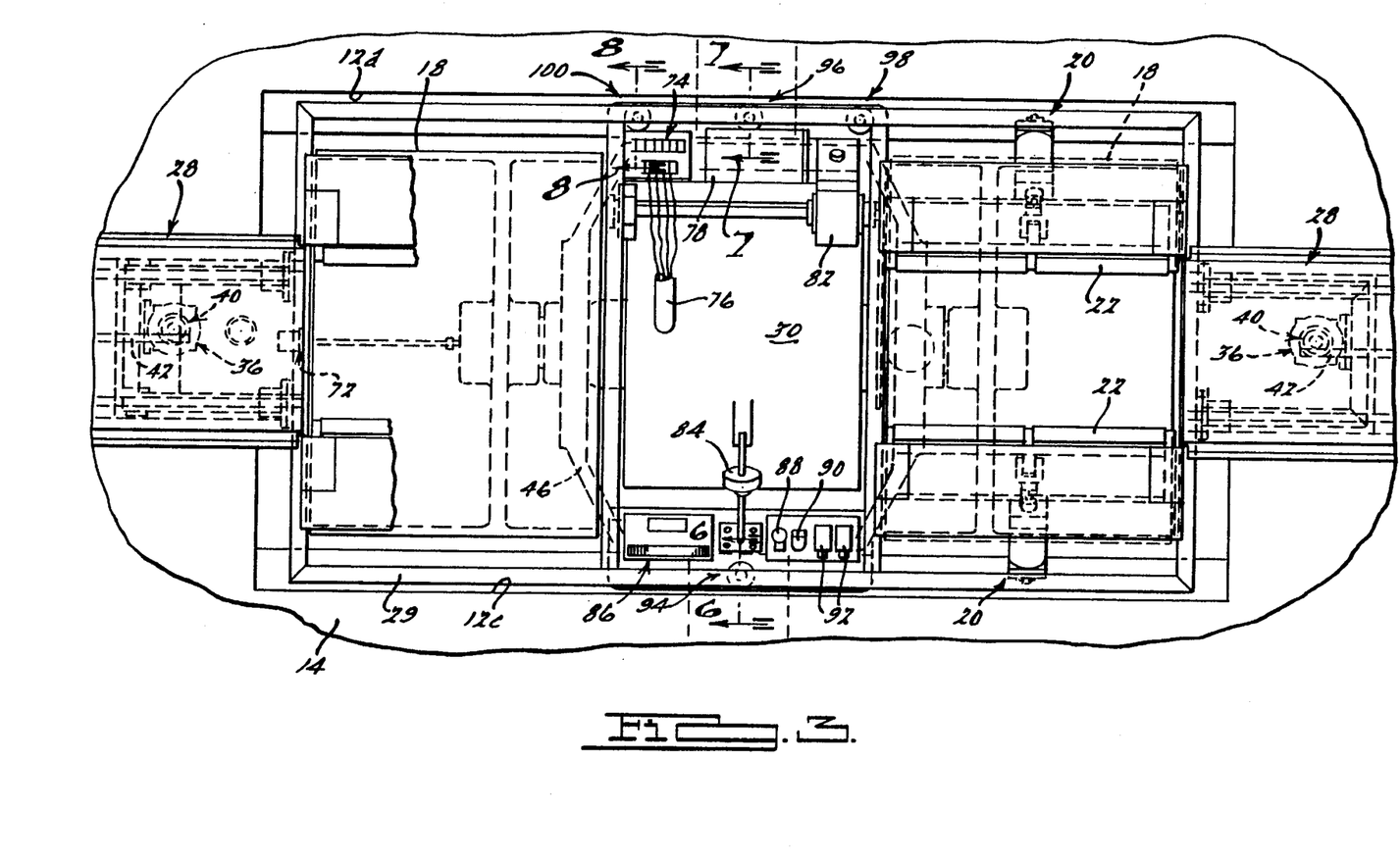

With specific reference to FIG. 5, the cradle 46 includes a first shoulder 48, an intermediate, semi-circular lower wall portion 50 integrally formed with the shoulder 48, and a second shoulder 52 integrally formed with the lower wall portion 50. A pair of end wall portions 54 each include semi-circular recesses 56 into which the bearing assemblies 34 may be inserted. A pair of planar portions 58 on opposite sides of the recesses 54 allow a pair of bearing caps 60 (only one being shown) to be fixedly secured to the end wall portions 54 to secure the input shaft and bearing assemblies to the cradle 46.

With further reference to FIG. 5, the first shoulder 48 further includes a first opening 62 and the second shoulder 52 includes a slot 64 and a pair of openings 66 disposed on opposite sides of the slot 64 closely adjacent opposite ends of the second shoulder 52. The lower wall portion 50 includes a pair of enlarged openings 68 for allowing a cooling air flow into the lower wall portion 50 to help cool the dynamometer apparatus 10. The lower wall portion 50 further optionally includes a plurality of legs 70 which enable the cradle 46 to be disposed securely on a floor prior to assembly within a pit. While the legs 70 are optional, they help to prevent the cradle 46 from rolling about on a floor prior to being installed in a pit. It will be appreciated that the legs 70, if included, could also have openings formed therein in vertical alignment with additional openings in the first and second shoulders 48 and 52, respectively. This would enable the leg portions 70 to be secured to the floor 12*a* of the pit 12 by suitable elongated fastening members inserted through the optional openings in the shoulders 48,52 during installation of the cradle 46. It is anticipated at the present time that such optional fastening of the legs 70 to the floor 12*a*, in most instances, will not be required to provide secure mounting of the cradle 46 within the pit 12.

The cradle 46 may be constructed from a wide variety of materials but is preferably cast from ductile iron. Ductile iron has the capability to deform or "stretch" under thermal stress. Since the ambient temperatures within the pit 10 may vary significantly, it is preferable that ductile iron be used rather than, for example, grey cast iron, which is not nearly as deformable as ductile iron.

With further reference to FIGS. 2 and 3, the dynamometer apparatus 10 further preferably includes a conventional encoder assembly 72 associated with one of the rolls 18. The pit 12 may optionally include a portion 12*b* for enabling easy access by an individual to the encoder 72 in the event service or maintenance of the encoder 72 is required.

With specific reference to FIG. 3, the power absorption unit 30 advantageously has various components which require access either for installation, periodic maintenance or repair disposed thereon in locations which allow an individual to access same without physically entering the pit 12. Accordingly, merely by leaning over from the floor 14 and reaching down slightly, an individual can access virtually all of the components of the dynamometer apparatus 10 requiring access either for installation, maintenance or repair. These components comprise a power terminal block 74 for supplying power to the power absorption unit 30 via suitable conductors disposed within a conduit 76, an optional bearing drive motor 78, which will be described momentarily, a pair of bearing drive chains 80, a pair of sleeves 81*a*, 81*b* coupled to the drive chains 80, and a gear assembly 82 for coupling the output shaft of the bearing drive motor 78 to the drive chains 80. Additionally, a load cell 84 is readily accessible as is an electronic control terminal block 86 for enabling communication with the power absorption unit 30 and an external computer (not shown). Still further, conventional controls associated with roll dynamometers such as an air pressure regulator valve 88, a brake solenoid 90 for controlling the static brake 35, and electronic solenoids 92 associated with the tire centering roller assemblies 20 are also disposed relative to the power absorption unit 30 so as to be readily accessible by an individual merely by simply leaning over the pit 12 and, therefore, without requiring the individual to actually step down into the pit 12.

With brief reference to FIG. 4*a*, each bearing assembly 34 is comprised of an inner bearing 34*a* and an outer bearing 34*b*. The outer bearing 34*b* is fitted to the cradle 46. One of the sleeves 81*a* extends into contact with the inner race of the outer bearing 34*b* and the outer race of the inner bearing 34*a* on one side of the power absorption unit 30 and rotates in a first direction. The other sleeve 81*b* (shown in FIG. 2) extends into contact between the bearings 34*a* and 34*b* on the opposite side of the power absorption unit 30 in identical fashion but is driven in the opposite direction of rotation to the sleeve 81*a*. The bearing drive motor 78, when incorporated, acts as the prime mover to drive the sleeves 81. The turning of identical sleeves 81 on each side of the power absorption unit at the same rotational speed, but in opposite directions, causes the torque imparted to the frame of the power absorption unit 30 on one side to be cancelled by the torque imparted to the frame on the other side. The uniform component of residual, uncancelled torque which exists due to one bearing having a slightly greater or lesser rolling resistance is measured during calibration by the load cell 84 and treated as a fixed offset in parasitic losses. The non-uniform, uncancelled torque imparted to the frame of the power absorption unit 30 by the turning of the sleeves 81 during portions of rotation of the sleeves 81 when a "tight spot" is encountered is digitally recorded during calibration by a suitable controller 83, and treated as a variable offset in parasitic losses. The sleeves 81, being mechanically coupled, are therefore synchronized. The digital recording of the non-uniform friction is synchronized to the mechanical rotation of the sleeves 81 by a Hall effect electronic sensor (not shown). A recording is then made of uncancelled friction measured during a single revolution of the sleeves 81. The principal advantage of the above-described mechanisms is to remove hysteresis from the load measuring system. A secondary advantage is the reduction of wear that would occur in the bearings between the frame of the power absorption unit 30 and the cradle 46. Instead of the load being constantly applied to a few bearing balls or rollers that experience little movement, it is distributed over all the bearing balls or rollers that are moved by the rotation of sleeves 81.

Referring now to FIGS. 3 and 4, the extremely compact dimensions of the pit 12 relative to the dynamometer apparatus 10 are apparent. The dynamometer apparatus 10, when using 48 inch diameter rolls 18 and when secured to the cradle 46, is about 52 inches wide, 122 inches long and about 62 inches high. Accordingly, the overall dimensions of the pit need only be slightly larger than these to enable the cradle 46 to be suspended within the pit 12. In practice, this enables large, single roll dynamometers to be used in pits which may be about only 20% the size of pits heretofore required for such types of dynamometers.

With the preferred embodiments of the dynamometer apparatus 10 and cradle 46 described herein, only about 2" of additional clearance is needed between front and back walls 12*c* and 12*d*, respectively, and the rolls 18. By keeping the front-to-back dimension of the pit 12 to a very minimum, interference with other test cell components embedded in the floor 14 is eliminated or minimized. The added floor space available as the result of the greatly reduced pit dimensions thus allows additional flexibility in locating other components frequently used in connection with dynamometers such as restraint system tracks, under-vehicle cooling fans, air ducts and other components installed below ground level.

Preferably, the pit 12 is formed with a step 12*e* on each of the front and back walls 12*c* and 12*d* which enables the cradle 46 to be secured within the pit 12 so as not to protrude above the floor 14. Preferably, the steps 12*e* are about 4"–6" in length and more preferably about 5" in length. Additionally, as mentioned previously herein, the cradle 46 is suspended within the pit 12 when coupled to the steps 12*e* of the front and back walls 12*c* and 12*d*, respectively. Alternatively, however, the legs 70 could be fastened directly to the floor 12a of the pit 12 provided suitable elongated fastening members such as elongated threaded bolts are incorporated which may be manipulated by an individual without requiring access to the interior area of the pit 12 near the floor 12a.

Referring further to FIG. 4, an important aspect of the present invention is the means by which the cradle 46 is secured to the steps 12e in the walls 12c and 12d of the pit 12. In this regard, the dynamometer apparatus 10 employs means for "restrictively clamping" portions of the cradle 46 to the steps 12e in a manner which prevents vibration and movement of the cradle 46 during rotation of the rolls 18, but yet which allows for a slight degree of thermal expansion and contraction of the cradle 46 in response to varying ambient temperatures within the pit 12 and its surrounding environment.

With brief reference to FIG. 3, the restrictive clamping described above is accomplished by securing the cradle 46 at four points 94, 96, 98 and 100. With specific reference to FIG. 4, the orientation of the shoulders 48 and 52 of the cradle 46 at points 94 and 96, respectively, relative to the steps 12e within the pit 12 is shown. The pit 12 preferably includes two lengths of angle iron 102a and 102b each having a length preferably at least about equal to the lateral length of the shoulders 48 and 52 of the cradle 46, and even more preferably sufficient to extend along the entire length of its associated wall 12c or 12d. Each of the lengths of angle iron 102a and 102b includes an element 103 welded or otherwise secured thereto which is embedded in its associated concrete wall portion 12c or 12d of the pit 12 during construction of the pit 12. Additional lengths of angle iron 104a are also preferably included at the top of each step 12e where the step terminates at the floor 14 to provide a durable edge surface. The lengths of angle iron 104 are preferably identical in construction to the lengths of angle iron 102a and 102b.

Referring to FIG. 6, a pivotal restrictive clamping assembly 105 for restrictively clamping the first shoulder 48 at the first point 94 is shown in greater detail. The restrictive clamping assembly 105 includes a metal mounting block 106 having a threaded aperture 108 which is welded or otherwise fixedly secured to the length of angle iron 102a disposed along the front wall 12c. A metal bushing 112 is included which is positioned in the opening 62 and which includes an aperture 114 through which a threaded bolt 116 is inserted so as to be threadably engaged with the mounting block 106. Preferably, a bushing insert 118 is disposed over the bushing 112. The bushing insert 118 is comprised of a relatively soft metal material as compared to that of the bushing 112 and preferably a spacing of about 0.001 inch to 0.002 inch is provided between the bushing insert 118 and the bushing 112. The bushing 112 itself further includes a protruding portion 120 for contacting the bearing insert 118 to minimize the area of contact between the bushing 112 in the bushing insert 118. Minimizing the area of contact helps to avoid any perpendicular misalignment of the threaded fastener 116 and bushing 112 relative to the coaxial center of the opening 62 in the first shoulder 48 of the cradle 46 which could contribute to producing an undesirable torque on the first shoulder 48. A washer 122 is also included for providing clearance between a head portion 116a of the threaded bolt 116 and the first shoulder 48. The bushing insert 118 protects the opening 62 in the event of extreme deformation of the first shoulder 48 which might cause the opening 62 to be damaged. Thus, the bearing insert 118 provides somewhat of a "safety cushion" to help prevent the opening 62 from becoming damaged in the event of extreme thermal expansion and contraction of the first shoulder 48. The bushing 112, bushing insert 118, washer 122 and threaded bolt 116 thus allow the first shoulder 48 to pivot about the approximate coaxial center of the opening 62 as needed to allow for movement created by thermal expansion and contraction of the cradle 46.

Referring now to FIG. 7, a linearly restrictive clamping assembly 124 for securing the second shoulder 52 of the cradle 46 at point 96 (FIG. 3) is shown. This restrictive clamping assembly 124 is adapted to secure the second shoulder 52 to the step 12e of the back wall 12d of the pit 12 to allow for expansion and contraction of the second shoulder 52 in opposite horizontal directions as indicated by arrow 126. A metal mounting block 128 is fixedly secured such as by welding to the length of angle iron 102b and includes a threaded aperture 130. A metal bushing 132 having an aperture 134 is disposed on the metal mounting block 128 and adapted to receive a threaded bolt 136 therethrough such that the threaded bolt 136 may threadably engage the threaded aperture 130 in the mounting block 128. A washer 142 allows the threaded bolt 136 to restrict vertical movement of the second shoulder 52 but to allow horizontal movement as the shoulder 52 moves horizontally in accordance with arrow 126 in response to thermal expansion and contraction of the cradle 46. Preferably, a clearance 144 in the range of about 0.001 inch–0.003 inch is provided between the washer 142 and an upper surface 52a of the shoulder 52 to allow for the horizontal movement of the second shoulder 52. Accordingly, the combination of the slot 64 and the linearly restrictive clamping assembly 124 allow the shoulder 52 to move slightly in opposite horizontal directions.

Referring now to FIG. 8, a third restrictive clamping assembly 146 is shown for use in connection with each one of the openings 66 in the second shoulder 52. A metal mounting block 148 having a threaded aperture 150 is fixedly secured such as by welding to the angle iron 102b. A metallic bushing 154 is disposed in the opening 66 and itself includes an aperture 156. The aperture 156 is adapted to receive a threaded bolt 158 which is threadably engaged with the threaded aperture 150 in the mounting block 148. A washer 162 allows the threaded bolt 158 to restrict vertical movement of the second shoulder 52. The bushing 154 preferably has a diameter less than that of the opening 66 to provide a radial clearance between the outer surface of the bushing 154 and the opening 66 of about 0.030 inch–0.060 inch. By providing this degree of radial clearance, the second shoulder 52 is afforded the capability of moving slightly in any horizontal direction in the event of thermal expansion and contraction of the cradle 46. It will be appreciated that the restrictive clamping assembly at point 98 (FIG. 3) is identical in construction to the restrictive clamping assembly 1.46 shown in FIG. 8. Thus, by the use of the pivotal restrictive clamping assembly 115, the linearly restrictive clamping assembly 124 and the third restrictive clamping assembly 146 the cradle 46 is securely affixed to the walls 12c and 12d of the pit 12 while still allowing for a slight degree of movement of the shoulders: 48 and 52 in response to thermal expansion and contraction of the cradle 46.

By bringing the pit walls 12c and 12d into close proximity to the dynamometer apparatus 10, the dynamometer apparatus 10 can thus be supported from the front and back walls 12c and 12d as well as optionally from the floor 12a of the pit 12. This results in a more stable installation with rigid lateral support which is not possible in large pit installations. Furthermore, by supporting the dynamometer laterally along the entire width of the power absorption unit 30, the dynamometer 10 support structure does not have to be as massive as is typically required when the only support available is from the bottom. The lateral support provided by the cradle 46 and pit walls 12c and 12d permit the entire dynamometer design to be made smaller, lighter and less expensive. A lighter machine can be more easily transported and requires less expensive lifting equipment at the installation site. The use of a narrower, more compact pit further simplifies the installation process by permitting closer access to the center of the pit where the dynamometer is installed. A wide pit requires that the dynamometer be cantilevered from one distant pit edge as it is lowered into place.

Referring now to FIGS. 3 and 4, the dynamometer apparatus 10 further includes means by which a cooling air flow may be circulated between the interior areas of the cradle 46 and the power absorption unit 30. Referring specifically to FIG. 4, to this end suitable ducting 162 is incorporated below the floor 14 during construction of the pit 12 to allow a cooling air flow to be directed into and exhausted out of the pit 12. In FIG. 4, ducting designated by reference numeral 162a represents an air inlet duct 162a for allowing air to be directed into the interior of the pit 12 and reference numeral 162b designates an air exhaust duct for permitting air to be exhausted from the interior area of the pit 12.

Referring now to FIG. 9, an air directing tubular member 164 is shown for cooperating with the exhaust duct 162b to allow air circulating between the cradle 46 and the power absorption unit 30 to be directed outwardly therefrom into the exhaust duct 162b. The air directing tubular member 164 includes a first portion 166 which is adapted to extend through the enlarged opening 68 in the lower wall portion 50 of the cradle 46 and partially into an opening 168 formed in an outer wall 170 of the power absorption unit 30. A second portion 172 of the tubular member 164 protrudes in alignment with the exhaust duct 162b. The first and second portions 166 and 172 include flanges 166a and 172a which are adapted to be secured together by threaded bolts 174 to the lower wall portion 50. It will be appreciated that an identical air directing tubular member 164 is disposed closely adjacent and in communication with the air inflow duct 162a (FIG. 4), and further in communication with another opening formed longitudinally opposite the opening 168 and preferably in coaxial alignment with the exhaust duct 162b. In this manner a cooling air flow may be directed in through the air inlet duct 162a (FIG. 4) and allowed to circulate between the interior surface of the lower wall portion 50 of the cradle 46 and the housing 170 of the power absorption unit 30 before exiting through the tubular member 164 into the exhaust duct 162b.

With further reference now to FIG. 5, the cradle 46 may optionally include an opening 176 at the bottom most portion of the lower wall portion 50. The opening 176 could help to allow a component such as a nut or bolt which is inadvertently dropped into the cradle 46 to fall therefrom to the floor 12a of the pit 12. It will be appreciated that the floor 12a itself could include, and preferably does include, at least one drain having a grate thereover (not shown) for allowing any fluids that enter the pit 12 to drain therefrom.

To install the dynamometer apparatus 10 in the pit 12 the cradle 46 is stood on a floor on its legs 70 and the power absorption unit 30 and attached rolls 18 are lowered onto the cradle 46 such that the bearing assemblies 34 disposed over opposite ends of the input shaft 32 are disposed within the semi-circular recesses 56 (FIG. 5) in the cradle 46. The bearing caps 60 are then fixedly secured to the end wall portions 54 of the cradle 46 and the entire cradle 46 is then lowered by any suitable means, such as a hoist or small crane, into the pit 12. The cradle 46 is lowered into the pit 12 until the first and second shoulders 48 and 52 are resting upon the steps 12e in the wall portions 12c and 12d. The cradle 46 may then be lifted slightly if necessary to rotate it a very small degree to align the openings 62 and 66 and the slot 64 with their mounting blocks 106, 148 and 128, respectively. At this point the shoulders 48 and 52 are secured to the pit 12 walls 12c and 12d by the restrictive clamping assemblies 115, 124 and 146.

It will be appreciated then that the dynamometer apparatus 10 of the present invention represents a very compact single roll dynamometer which may be installed in a very compact pit having dimensions considerably less than have heretofore been required with prior art dynamometer systems. Accordingly, the expense of constructing the pit itself and the requirement for having sufficient clearance between the perimeter of the dynamometer and the walls of the pit to permit easy manual access by an individual, or even to allow an individual to walk down into the pit to obtain access to the perimeter of the dynamometer is eliminated. The ability of the dynamometer apparatus 10 to be used with a much smaller diameter pit than heretofore required is further expected to permit the dynamometer apparatus 10 to be used in a variety of environments where limited space considerations might prevent the construction of a conventionally sized pit and conventional dynamometer system. Such installations might include those at service stations or tune-up facilities where floor space limitations would otherwise not permit the construction of a conventionally sized pit.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A single roll dynamometer apparatus adapted to be disposed within a compact pit defined by a plurality of vertical walls and a floor, said apparatus comprising:

a pair of rolls adapted to engage the driven wheels of a vehicle;

power absorption means disposed coaxially with a longitudinal axis of rotation of said rolls and in between said rolls for simulating load forces typically experienced by said vehicle during operation; and cradle means for mounting said power absorption means and therefore said rolls within said pit in a manner not requiring additional clearance between said rolls and said power absorption means and said walls and floor of said pit for access by individuals.

2. The apparatus of claim 1, further comprising means for coupling said cradle to at least one of said vertical walls of said pit in a manner to allow for thermal expansion and contraction of said cradle means in response to temperature changes within said pit.

3. The apparatus of claim 1, wherein said power absorption means includes at least one power terminal block for supplying power to said power absorption means, said power terminal block being positioned so as to be accessible by an individual without physically entering said pit.

4. The apparatus of claim 1, wherein said power absorption means includes a control terminal block for electronically communicating with said power absorption means, said control terminal block being disposed so as to enable access thereto by an individual without said individual physically entering said pit.

5. The apparatus of claim 1, further comprising:

a pair of bearing means each having an inner bearing and an outer bearing disposed on opposite sides of said power absorption means, with each of said bearings having an inner race and an outer race, said inner bearing being for supporting the frame of said power absorption means rotationally relative to said cradle means;

a bearing motor positioned relative to said power absorption means to enable access to said bearing motor by an individual without said individual entering said pit;

sleeve means for coupling said bearing motor with said pair of bearing means such that said inner race of said outer bearing on one side of said power absorption means is driven in an opposite direction to said inner race of said outer bearing on the other side of said power absorption means to cancel the frictional effect of the bearing means on the two sides;

means for measuring, during calibration, variations in uncancelled friction as a function of bearing rotation; and means for compensating for said variations in uncancelled friction during operation of said apparatus.

6. The apparatus of claim 1, further comprising:

tire centering means associated with at least one of said rolls for maintaining said wheels of said vehicle centered upon said rolls during operation of said apparatus.

7. The apparatus of claim 1, wherein said cradle means comprises:

a first shoulder, a generally semi-circular lower wall portion integrally formed with said first shoulder, and a second shoulder integrally formed with said semi-circular lower wall portion;

said first shoulder including an opening for allowing said first shoulder to be pivotally restrictively coupled to a first one of said vertical wall portions of said pit;

said second shoulder including a slot;

restrictive clamping means extending through said slot for restrictively clamping said second shoulder to a second one of said vertical wall portions of said pit, said slot enabling said second shoulder to move generally linearly in first and second opposite generally horizontal directions in response to thermal expansion and contraction of said cradle means; and an opening disposed in said second shoulder adapted to cooperate with a second coupling assembly for coupling said second shoulder to said second one of said vertical wall portions of said pit in a manner to allow said second shoulder to move laterally of said first and second opposite directions in response to thermal expansion and contraction of said cradle means.

8. The apparatus of claim 1, wherein said cradle means comprises a pair of openings formed in said lower wall portion for allowing an air flow to circulate in between said cradle means and said power absorption means.

9. A single roll dynamometer apparatus adapted to be disposed within a compact pit in a manner not requiring additional clearance between the perimeter of said apparatus and the walls of said pit sufficient to permit an individual to enter said pit when said dynamometer apparatus is disposed in said pit, said apparatus comprising:

a pair of rolls for engaging a pair of driven wheels of a vehicle, said rolls being disposed such that a surface thereof is positioned at approximately ground level;

a power absorption unit disposed in between said rolls and having an input shaft coupled to said rolls for simulating road load and vehicle inertia forces typically experienced by a vehicle during operation;

cradle means for supporting said power absorption unit, and therefore said rolls, within said pit, said cradle means including a first shoulder adapted to be coupled to a first wall of said pit, an intermediate wall portion adapted to support at least a portion of said power absorption unit, and a second shoulder adapted to be restrictively clamped to a second wall of said pit; and means for restrictively clamping said second shoulder to said second wall of said pit to thereby allow said second shoulder to move relative to said first shoulder in response to thermal expansion and contraction of said cradle means.

10. The apparatus of claim 9, wherein said cradle means further comprises a pair of openings formed in said intermediate portion for allowing air flow to circulate in between said intermediate portion and said power absorption unit.

11. The apparatus of claim 9, wherein said second shoulder includes a slot; and wherein said means for restrictively clamping includes a bushing adapted to fit within said slot; and a fastening member extending through said bushing into locking engagement with said second wall portion of said pit, said fastening member preventing vertical movement of said second shoulder relative to said pit but allowing horizontal movement of said second shoulder relative to said pit.

12. The apparatus of claim 11, wherein said second shoulder further includes at least one opening on opposite sides of said slot; and wherein said means for restrictively clamping further includes a bushing adapted to be inserted within said openings in said second shoulder such that a predetermined minimum radial clearance is present between said bushing and said opening to thereby allow for movement of said second wall portion in any horizontal direction relative to said pit in response to thermal expansion and contraction of said cradle means during operation of said dynamometer apparatus.

13. The apparatus of claim 9, wherein said cradle means includes a plurality of legs protruding therefrom and positioned to support said cradle on a floor prior to said cradle means being installed in said pit.

14. The apparatus of claim 10, further comprising:

a pair of air directing tubular members coupled to said intermediate portion of said cradle means to help direct a cooling air flow into and out of said cradle means.

15. The dynamometer apparatus of claim 9, wherein said power absorption unit comprises an input shaft fixedly coupled to said rolls; and wherein said dynamometer apparatus further includes a pair of bearing assemblies each having an inner race and an outer race for supporting said input shaft rotationally relative to said cradle means; and a bearing motor for driving said inner race of at least one of said bearing assemblies in an opposite direction to said outer race during rotation of said rolls; and means for coupling said bearing motor to said inner race.

16. A single roll dynamometer apparatus adapted to be disposed within a compact pit in a manner so as to only require a minimal degree of clearance between said dynamometer apparatus and a plurality of wall portions of said pit, said apparatus comprising:

a pair of rolls adapted to support and be driven by a pair of driven wheels of a vehicle;

a power absorption unit having an input shaft extending in coaxial alignment with an axis of rotation of said rolls and being secured to each of said rolls;

a cradle for suspending said power absorption unit within said pit;

a pair of bearing assemblies disposed on opposite sides of said power absorption unit for supporting said input shaft for rotational movement relative to said cradle; and means for restrictively clamping portions of said cradle to wall portions of said pit in a manner to allow for thermal expansion and contraction of said cradle in response to ambient temperature variations in said pit.

17. The apparatus of claim 16, wherein said cradle comprises a first shoulder, an intermediate, semi-circular lower wall portion, and a second shoulder;

said wall portions of said pit including a front wall portion and a back wall portion;

said first shoulder of said cradle being adapted to be pivotally restrictively coupled to said front wall portion; and said second shoulder of said cradle being adapted to be restrictively clamped to said back wall portion of said pit to thereby allow said second shoulder to move in horizontal directions relative to said pit in response to thermal expansion and contraction of said cradle during operation of said dynamometer apparatus.

18. The apparatus of claim 16, wherein said cradle includes a pair of openings for allowing a cooling air flow to circulate closely adjacent said power absorption unit during operation of said dynamometer apparatus.

19. The apparatus of claim 17, wherein said second shoulder includes a slot and a pair of openings formed on opposite sides of said slot; and first fastening means cooperating with said slot to restrictively clamp said second shoulder to said back wall portion of said pit while allowing said second shoulder to move linearly in first and second opposite horizontal directions in response to thermal expansion of said cradle; and second fastening means for cooperating with said openings formed in said second shoulder for restrictively clamping said second shoulder to said back wall portion of said pit in a manner which allows a degree of movement of said second shoulder in any horizontal direction while restricting vertical movement of said second shoulder relative to said pit as said cradle thermally expands and contracts during operation of said apparatus.

20. The apparatus of claim 19, wherein said first fastening means comprises:

a bushing disposed within said slot;

a mounting block secured to an edge of said front wall of said pit;

a washer disposed over said bushing; and a fastening member extending through said washer and said bushing into threaded engagement with said mounting block.

21. The apparatus of claim 19, wherein said second fastening means comprises:

a bushing positioned within said opening in said second shoulder;

a mounting block secured fixedly to said back wall of said pit;

a washer positioned over a portion of said bushing; and a threaded fastener extending through said washer and said bushing into threaded engagement with said mounting secured to said back wall portion of said pit, said bushing having dimensions for allowing a radial clearance of at least about 0.030 inch between an outer wall thereof and said opening in said second shoulder to thereby allow a limited degree of movement in any horizontal direction by said second shoulder relative to said bushing.

22. A chassis dynamometer adapted for mounting within a pit having walls, comprising:

a roller located within the pit and adapted to engage a driving wheel of a vehicle positioned on the roller;

a power absorption unit (PAU) rotationally coupled to the roller for simulating load forces experienced by the vehicle during operation; and a support member for rotationally mounting the PAU and including a mounting assembly for securing the support member such that the support member, the entire PAU and the roller are suspended within the pit.

23. A chassis dynamometer according to claim 22 wherein the PAU is coaxially coupled to the roller and wherein the support member rotationally supports both the PAU and the roller within the pit so that both the PAU and roller are suspended within the pit.

24. The chassis dynamometer of claim 23 wherein the roller comprises a pair of rolls rotationally supported by the support member co-axially with the PAU and on either side of the PAU, so that the PAU and both rolls are suspended within the pit.

25. The chassis dynamometer of claim 22 wherein said mounting assembly allows for thermal expansion and contraction of the support member in response to temperature changes within the pit.

26. The chassis dynamometer of claim 22 wherein said PAU includes at least one power terminal block for supplying power to said PAU, said power terminal block being positioned so as to be accessible by an individual without physically entering the pit.

27. The chassis dynamometer of claim 22 wherein said PAU includes a control terminal block for electronically communicating with said PAU, said control terminal block being disposed so as to enable access thereto by an individual without said individual physically entering said pit.

* * * * *